US007636719B2

(12) United States Patent
Thompson et al.

(10) Patent No.: US 7,636,719 B2
(45) Date of Patent: Dec. 22, 2009

(54) CONTACT SCHEMA

(75) Inventors: J. Patrick Thompson, Seattle, WA (US);
Walter R. Smith, Seattle, WA (US);
Kim Cameron, Bellevue, WA (US);
Jonathan D. Perlow, Seattle, WA (US);
Dejan Subotic, Redmond, WA (US);
Melissa W. Dunn, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 10/324,243

(22) Filed: Dec. 19, 2002

(65) Prior Publication Data

US 2004/0122822 A1    Jun. 24, 2004

(51) Int. Cl.
G06F 7/00         (2006.01)
G06F 17/00        (2006.01)
(52) U.S. Cl. .......................................... 707/100; 707/1
(58) Field of Classification Search ................. 707/102, 707/3, 104.1, 10, 5, 2, 100, 1; 705/1; 709/229, 709/204
See application file for complete search history.

(56) References Cited

U.S. PATENT DOCUMENTS

| 5,214,756 | A | 5/1993 | Franklin |
| 5,640,565 | A | 6/1997 | Dickinson .................. 395/712 |
| 5,659,788 | A | 8/1997 | Sorneya |
| 5,737,726 | A | 4/1998 | Cameron ....................... 705/7 |
| 5,767,897 | A | 6/1998 | Howell |
| 5,870,744 | A | 2/1999 | Sprague |
| 5,873,108 | A | 2/1999 | Goyal ......................... 707/507 |
| 5,896,321 | A | 4/1999 | Miller |
| 5,913,032 | A | 6/1999 | Schwartz |
| 5,923,848 | A | 7/1999 | Goodhand ............. 395/200.49 |
| 5,950,193 | A * | 9/1999 | Kulkarni ......................... 707/3 |
| 5,959,629 | A | 9/1999 | Masui |
| 5,999,208 | A | 12/1999 | McNerney |

(Continued)

FOREIGN PATENT DOCUMENTS

JP          9-046335          2/1997

(Continued)

OTHER PUBLICATIONS

Mohamed; "Marketcircle a recipient of the 2002 Apple Design Awards"; May 15, 2002; Marketcircle.*

(Continued)

*Primary Examiner*—John E Breene
*Assistant Examiner*—Giovanna Colan
(74) *Attorney, Agent, or Firm*—Workman Nydegger

(57) ABSTRACT

A schema is provided that defines people, groups and organizations by their corresponding contact information and other related characteristics. The schema defines a person by personal data, name data, location data, and e-address data. A group is defined by group membership data and e-address data. An organization is defined by location data and by e-address data. The schema also defines role occupancies for interrelating the various contacts. The role occupancies are defined by role occupancy data that may include employee data, team member data, group membership data, family data, customer or business data, and other types of data that can link two or more contacts. By interrelating contacts based on role occupancies, the schema is able to provide rich querying of one or more databases for obtaining desired contact information.

18 Claims, 7 Drawing Sheets

U.S. PATENT DOCUMENTS

| | | | |
|---|---|---|---|
| 6,008,799 | A | 12/1999 | Van Kleeck |
| 6,014,135 | A | 1/2000 | Fernandes |
| 6,026,396 | A | 2/2000 | Hall |
| 6,065,012 | A | 5/2000 | Balsara |
| 6,208,339 | B1 | 3/2001 | Atlas |
| 6,209,005 | B1 | 3/2001 | Harker ........................ 707/501 |
| 6,212,534 | B1 | 4/2001 | Lo |
| 6,216,122 | B1 | 4/2001 | Elson |
| 6,247,043 | B1 | 6/2001 | Bates |
| 6,269,369 | B1 | 7/2001 | Robertson ........................ 709/1 |
| 6,324,541 | B1 | 11/2001 | de l'Etraz et al. |
| 6,339,826 | B2 | 1/2002 | Hayes |
| 6,411,961 | B1 | 6/2002 | Chen |
| 6,434,564 | B2 | 8/2002 | Ebert ........................ 707/100 |
| 6,460,074 | B1 | 10/2002 | Fishkin |
| 6,539,379 | B1 | 3/2003 | Vora ........................ 707/6 |
| 6,557,004 | B1 | 4/2003 | Ben-Schachar et al. |
| 6,564,213 | B1 | 5/2003 | Ortega |
| 6,571,235 | B1 | 5/2003 | Marpe |
| 6,581,059 | B1 | 6/2003 | Barrett |
| 6,581,062 | B1 | 6/2003 | Draper |
| 6,609,108 | B1 | 8/2003 | Pulliam |
| 6,643,661 | B2 | 11/2003 | Polizzi |
| 6,661,434 | B1 | 12/2003 | MacPhail |
| 6,668,281 | B1 | 12/2003 | Ayyadurai ........................ 709/223 |
| 6,678,685 | B2 * | 1/2004 | McGill et al. ........................ 707/10 |
| 6,699,125 | B1 | 3/2004 | Kirmse |
| 6,701,348 | B2 | 3/2004 | Sommerer |
| 6,718,366 | B2 | 4/2004 | Beck ........................ 709/203 |
| 6,753,889 | B1 | 6/2004 | Najmi |
| 6,781,608 | B1 | 8/2004 | Crawford |
| 6,791,583 | B2 | 9/2004 | Tang |
| 6,820,075 | B2 | 11/2004 | Shanahan |
| 6,820,204 | B1 | 11/2004 | Desai |
| 6,828,988 | B2 | 12/2004 | Hudson |
| 6,829,607 | B1 | 12/2004 | Tafoya |
| 6,832,263 | B2 | 12/2004 | Polizzi |
| 6,839,680 | B1 * | 1/2005 | Liu et al. ........................ 705/10 |
| 6,845,370 | B2 | 1/2005 | Burkley |
| 6,859,823 | B1 | 2/2005 | Nishihara |
| 6,870,921 | B1 | 3/2005 | Elsey |
| 6,871,140 | B1 | 3/2005 | Florance |
| 6,883,000 | B1 | 4/2005 | Gropper |
| 6,895,388 | B1 | 5/2005 | Smith |
| 6,907,580 | B2 | 6/2005 | Michelman |
| 6,947,929 | B2 | 9/2005 | Bruce |
| 6,959,340 | B1 | 10/2005 | Najmi |
| 6,983,310 | B2 | 1/2006 | Rouse ........................ 709/206 |
| 6,985,924 | B2 | 1/2006 | Schwartz ........................ 709/206 |
| 6,988,128 | B1 | 1/2006 | Alexander |
| 6,990,495 | B1 | 1/2006 | Grason ........................ 707/10 |
| 6,993,712 | B2 | 1/2006 | Ramachandran |
| 7,007,149 | B2 | 2/2006 | Chung |
| 7,010,572 | B1 | 3/2006 | Benjamin ........................ 709/206 |
| 7,010,599 | B2 | 3/2006 | Shrinivasan ........................ 709/225 |
| 7,010,616 | B2 | 3/2006 | Carlson |
| 7,043,471 | B2 | 5/2006 | Cheung |
| 7,068,768 | B2 | 6/2006 | Barnes |
| 7,076,498 | B2 | 7/2006 | Banerjee |
| 7,096,232 | B2 | 8/2006 | Doss |
| 7,113,941 | B2 | 9/2006 | Arend |
| 7,117,271 | B2 | 10/2006 | Haverstock |
| 7,130,853 | B2 | 10/2006 | Roller ........................ 707/1 |
| 7,139,774 | B2 | 11/2006 | Dettinger ........................ 707/100 |
| 7,143,190 | B2 | 11/2006 | Christensen |
| 7,146,570 | B2 | 12/2006 | Yeh ........................ 715/758 |
| 7,149,731 | B2 | 12/2006 | Dettinger ........................ 707/2 |
| 7,159,207 | B2 | 1/2007 | Tang |
| 7,162,474 | B1 | 1/2007 | Harker |
| 7,185,271 | B2 | 2/2007 | Lee |
| 7,191,210 | B2 | 3/2007 | Grossman |
| 7,209,951 | B2 | 4/2007 | Goldberg |
| 7,240,298 | B2 | 7/2007 | Grossman |
| 7,287,053 | B2 * | 10/2007 | Bodin ........................ 709/204 |
| 7,302,634 | B2 | 11/2007 | Lucovsky |
| 2002/0073207 | A1 | 6/2002 | Widger ........................ 709/206 |
| 2002/0107914 | A1 | 8/2002 | Charisius |
| 2002/0120864 | A1 | 8/2002 | Wu |
| 2002/0143961 | A1 | 10/2002 | Siegel |
| 2002/0174237 | A1 * | 11/2002 | Shrinivasan et al. ........ 709/229 |
| 2002/0186257 | A1 | 12/2002 | Cadiz |
| 2003/0041065 | A1 * | 2/2003 | Lucovsky et al. ........... 707/10 |
| 2003/0041076 | A1 | 2/2003 | Lucovsky |
| 2003/0050911 | A1 | 3/2003 | Lucovsky |
| 2003/0069874 | A1 | 4/2003 | Hertzog ........................ 707/1 |
| 2003/0126137 | A1 * | 7/2003 | McFadden ........................ 707/100 |
| 2003/0158855 | A1 | 8/2003 | Farnham |
| 2003/0164862 | A1 | 9/2003 | Cadiz ........................ 715/838 |
| 2003/0210265 | A1 | 11/2003 | Haimberg |
| 2004/0083453 | A1 | 4/2004 | Knight |
| 2004/0093334 | A1 | 5/2004 | Scherer |
| 2004/0103364 | A1 | 5/2004 | Dornback |
| 2004/0107283 | A1 | 6/2004 | Paddon |
| 2004/0117322 | A1 | 6/2004 | Bjorksten |
| 2004/0119732 | A1 | 6/2004 | Grossman |
| 2004/0119758 | A1 | 6/2004 | Grossman |
| 2004/0119760 | A1 | 6/2004 | Grossman |
| 2004/0122683 | A1 | 6/2004 | Grossman |
| 2004/0139025 | A1 | 7/2004 | Coleman |
| 2004/0177082 | A1 | 9/2004 | Nitta |
| 2004/0210844 | A1 | 10/2004 | Pettinati |
| 2004/0235520 | A1 | 11/2004 | Cadiz |
| 2004/0236792 | A1 | 11/2004 | Celik |
| 2004/0243935 | A1 | 12/2004 | Abramovitch |
| 2004/0260948 | A1 | 12/2004 | Miyata |
| 2005/0002510 | A1 | 1/2005 | Elsey |
| 2005/0004874 | A1 | 1/2005 | Gilmour |
| 2005/0015439 | A1 | 1/2005 | Balaji |
| 2005/0080805 | A1 | 4/2005 | Haeberle |
| 2005/0091072 | A1 | 4/2005 | Dunn |
| 2005/0114329 | A1 | 5/2005 | Dettinger |
| 2005/0131888 | A1 | 6/2005 | Tafoya |
| 2005/0182741 | A1 | 8/2005 | Grossman |
| 2005/0262208 | A1 | 11/2005 | Haviv ........................ 709/206 |
| 2005/0283468 | A1 | 12/2005 | Karnvar |
| 2006/0010104 | A1 | 1/2006 | Pettinati |
| 2006/0041545 | A1 | 2/2006 | Heidloff |
| 2006/0053384 | A1 | 3/2006 | La Fetra |
| 2006/0064645 | A1 | 3/2006 | Neven |
| 2006/0174002 | A1 | 8/2006 | Shrinivasan |
| 2006/0253787 | A1 | 11/2006 | Fogg ........................ 379/88.13 |
| 2006/0277213 | A1 | 12/2006 | Robertson ........................ 707/10 |

FOREIGN PATENT DOCUMENTS

| | | |
|---|---|---|
| JP | 9-503088 | 3/1997 |
| JP | 2000-315234 | 11/2000 |
| JP | 2002-517863 | 6/2002 |
| JP | 2002-312404 | 10/2002 |
| WO | WO 95/23371 | 8/1995 |
| WO | WO 99/64970 | 12/1999 |
| WO | WO 01-80190 | 1/2001 |
| WO | WO 02/073454 | 9/2002 |
| WO | 2005013079 | 10/2005 |

OTHER PUBLICATIONS

By Gordon Padwick, Helen Feddema; ProQuest Information and Learning- "Special Edition Using Microsoft Outlook 2000"; Publisher: Que; Pub Date: May 12, 1999; "Safari Tech Books, Online".*
By Gordon Padwick, Helen Feddema; ProQuest Information and Learning- "Special Edition Using Microsoft Outlook 2000"; Publisher: Que; Pub Date: May 12, 1999; "Safari Tech Books, Online".*
Mohamed; "Marketcircle a recipient of the 2002 Apple Design Awards"; May 15, 2002; Marketcircle.*

U.S. Appl. No. 10/780,496, filed Feb. 17, 2004, Grossman.
U.S. Appl. No. 10/324,251, filed Dec. 19, 2002, Grossman.
Hibbert, Chris, "Visual Flex and XML", downloaded from www.dataaccess.com/whitepapers/xml/XMLWP.htm, dated by Wayback Machine as: May 2, 2001, pp. 1-25.
Dogac, Asuman, et al., "An ebXML Infrastructure Implementation through UDDI Registries and RosettaNet PIPs", ACMSIGMOD 2002, Madison, WI, Jun. 4-6, 2002, pp. 512-523.
Ren, Ligang, et al., "Data Synchronization in the Mobile Internet", The 7th Intl Conf on CSCW in Design, Sep. 25-27, 2002, pp. 95-98.
Lee, Jinho, et al., "An Evaluation of the Incorporation of a Semantic Network Into a Multidimensional Retrieval Engine", CIKM '03 New Orleans, LA, Nov. 3-8, 2003, pp. 572-575.
Su, Hong, et al., "Automating the Transformation of XML Documents", WIDM 2001, Altanta, GA, Nov. 2001, pp. 68-75.
McCabe, M. Catherine, et al., "On the Design and Evaluation of a Multi-Dimensional Approach to Information Retrieval", SIGIR 2000, Athens, Greece, Jul. 2000, pp. 363-365.
Bussler, Chrisoph, et al., "A Conceptual Architecture for Semantic Web Enabled Services", SIGMOD Record, vol. 31, No. 4, Dec. 2002, pp. 24-29.
Nejdl, Wolfgang, et al., "EDUTELLA: A P2P Networking Infrastructure Based on RDF", WWW 2002, Honolulu, HI, May 7-11, 2002, pp. 604-615.
Bychkov, Yury, et al., "Interactive Migration of Legacy Databases to Net-Centric Technologies", Proceedings of the 8th Working Conference on Reverse Engineering, Oct. 2-5, 2001, pp. 328-334.
Bakker, John-Luc, et al., "Next Generation Service Creation Using XML Scripting Languages", IEEE International Conference on Communications, vol. 4, Apr. 22 May 2, 2001, pp. 2001-2007.
Padwick, Faddema, Special Edition Using Microsoft Outlook 2000, Que, Ch. 9 'Managing Contacts', p. 1-17.
Padwick, Faddema, Special Edition Using Microsoft Outlook 2000, Que, Ch. 16 'Managing Your Computer Environment': Using Other Shortcuts in the Outlook Bar, p. 1-4.
Padwick, Feddema, Special Edition Using Microsoft Outlook 2000, Que, Ch. 18 'Finding and Organizing Outlook Items': Using the QuickFind Contact Tool, p. 1-4.
Padwick, Feddema, Special Edition Using Microsoft Outlook 2000, Que, Ch. 18 'Finding and Organizing Outlook Items': Organizing Outlook Items, p. 1-7.
Padwick, Feddema, Special Edition Using Microsoft Outlook 2000, Que, Ch. 22 'Creating and Using Rules', p. 1-5.
Padwick, Feddema, Special Edition Using Microsoft Outlook 2000, Que, Ch. 38 'Creating Views and Print Styles', p. 1-25.
Padwick, Feddema, Special Edition Using Microsoft Outlook 2000, Que, Ch. 41 'Creating and Using Custom Fields': Why Do You Need Custom Fields?, p. 1-14.
Padwick, Feddema, Special Edition Using Microsoft Outlook 2000, Que, Ch. 41 'Creating and Using Custom Fields': Creating a Simple Custom Field, p. 1-3.
Padwick, Feddema, Special Edition Using Microsoft Outlook 2000, Que, Appendix C 'Outlook's Files, Folders, Fields, and Registry Keys', p. 1.
U.S. Appl. No. 11/760,392, filed Jun. 8, 2007, Grossman.
Office Action mailed Jun. 22, 2007 cited in related U.S. Appl. No. 10/692,257.
Notice of Allowance mailed Mar. 27, 2007 cited in related U.S. Appl. No. 10/324,251.
Office Action mailed Jun. 5, 2007, cited in related U.S. Appl. No. 10/885,974.
Notice of Allowance mailed Aug. 9, 2007, cited in related U.S. Appl. No. 10/324,250.
Notice of Allowance mailed Jul. 3, 2007, cited in related U.S. Appl. No. 10/324,746.
Office Action mailed Aug. 3, 2007, cited in related U.S. Appl. No. 10/324,243.
Notice of Allowance mailed Aug. 8, 2007, cited in related U.S. Appl. No. 10/326,660.
Microsoft Computer Dictionary, 2002, Microsoft Press, 5th edition, p. 162.
Kim, Sung Wan, et al., "Developing a Native Storage Structure for XML Repository System in Main Memory", 5th International Conference on High Speed Networks and Multimedia Communications, © 2002, pp. 96-100.
Shui, William M., et al., "Application of XML Schema and Active Rules System in Management and Integration of Heterogeneous Biological Data", BIBE '03, Mar. 10-12, 2003, pp. 367-374.
Banerjee, Sandeepan, et al., "Oracle8i—The XML Enabled Data Management System", 16th International Conference on Data Engineering, San Diego, CA Feb. 29-Mar. 3, 2000, pp. 561-568.
Haas, L.M., et al. "Transforming Heterogeneous Data with Database Middleware: Beyond Integration", Bulletin of the IEEE Computer Society Technical Committee on Data Engineering, © 1997, pp. 1-6.
Nambiar, Uilas, et al., "Current Approaches to XML Management", IEEE Internet Computing, vol. 6, Issue4, Jul./Aug. 2002, pp. 43-51.
Lear, Ann C., et al, "XML Seen as Integral to Application Integration", IT Professional, vol. 1, Issue 5, Sep./Oct. 1999, pp. 12-16.
Paul McFedries, Complete Idiot's Guide to Windows XP, Pub Date: Oct. 3, 2001. pp. 1-3.
Paul Thurrott's SuperSite for Windows: Internet Explorer 5.0 Reviewed. Duke Communications International, Inc. 2000. pp. 1-8.
Office Action dated Aug. 17, 2007 cited in related U.S. Appl. No. 10/780,496.
Office Action dated Aug. 23, 2007 cited in related U.S. Appl. No. 10/845,464.
Office Action dated Oct. 5, 2007 cited in related U.S. Appl. No. 10/885,974.
Notice of Allowance dated Oct. 2, 2007 cited in related U.S. Appl. No. 10/324,250.
Notice of Allowance dated Oct. 5, 2007 cited in related U.S. Appl. No. 10/326,660.
U.S. Appl. No. 12/195,214, filed Aug. 20, 2008, Pettinati.
Zhan, H. F., et al., "A Web-Based Collaborative Product Design Platform for Dispersed Network Manufacturing", Journal of Materials Processing, vol. 138, Isssues 1-3, Jul. 20, 2003, pp. 600-604.
Huynh, David, et al., "Haystack: A Platform for Creating, Organizing and Visualization Information Using RDF", Semantic Web Workshop (atWWW2002), Honolulu, HI, May 2002, pp. 1-11.
Getting Results with Microsoft Office 97, Microsoft Corp., Redmond, WA, © 1997, pp. 28-31, 345-374 and 470-471.
Padwick, Gordon et al., Special Edition Using Microsoft Outlook 2000, Que Corp., Indianapolis, IN, May 1999, pp. 370-376, 382-386 and 392-396.
Morrison, Michael et al., XML Unleashed, Sams Corp., Indianapolis, IN, Dec. 1999, pp. 26-37, 84-104 and 106-122.
Office Action dated Jun. 6, 2006 cited in U.S. Appl. No. 10/324,746.
Office Action dated Feb. 26, 2007 cited in U.S. Appl. No. 10/324,746.
Notice of Allowance dated Sep. 7, 2007 cited in U.S. Appl. No. 10/327,746.
Office Action dated Apr. 6, 2007 cited in U.S. Appl. No. 10/845,464.
Office Action dated Jan. 28, 2008 cited in related U.S. Appl. No. 10/845,464.
Notice of Allowance dated May 19, 2008 cited in U.S. Appl. No. 10/845,464.
Notice of Allowance dated Jun. 13, 2008 cited in U.S. Appl. No. 10/885,974.
Office Action dated Apr. 5, 2006 cited in U.S. Appl. No. 10/324,250.
Office Action dated Sep. 22, 2006 cited in U.S. Appl. No. 10/324,250.
Office Action dated Feb. 7, 2007 cited in U.S. Appl. No. 10/324,250.
Notice of Allowance dated Nov. 16, 2007 cited in U.S. Appl. No. 10/324,250.
Office Action dated Apr. 14, 2006 cited in U.S. Appl. No. 10/324,251.
Office Action dated Nov. 3, 2006 cited in U.S. Appl. No. 10/324,251.
Office Action dated Apr. 3, 2006 cited in U.S. Appl. No. 10/324,246.
Office Action dated Oct. 31, 2006 cited in U.S. Appl. No. 10/324,246.
Office Action dated Mar. 21, 2007 cited in U.S. Appl. No. 10/324,246.
Notice of Allowance dated Oct. 4, 2007 cited in U.S. Appl. No. 10/324,246.
Notice of Allowance dated Dec. 13, 2007 cited in U.S. Appl. No. 10/324,246.
Office Action dated Apr. 17, 2006 cited in U.S. Appl. No. 10/326,660.
Office Action dated Oct. 16, 2006 cited in U.S. Appl. No. 10/326,660.

Office Action dated Feb. 8, 2007 cited in U.S. Appl. No. 10/326,660.
Notice of Allowance dated Nov. 16, 2007 cited in U.S. Appl. No. 10/326,660.
Office Action dated Sep. 13, 2006 cited in U.S. Appl. No. 10/780,496.
Office Action dated Mar. 16, 2007 cited in U.S. Appl. No. 10/780,496.
Office Action dated Feb. 7, 2008 cited in U.S. Appl. No. 10/780,496.
Office Action dated Nov. 16, 2007 cited in U.S. Appl. No. 10/692,257.
Office Action dated Apr. 7, 2008 cited in U.S. Appl. No. 10/692,257.
Office Action dated Oct. 27, 2008 cited in U.S. Appl. No. 10/692,257.
Notice of Allowance dated Mar. 30, 2009 cited in U.S. Appl. No. 10/692,257.
Anderson, T., *Change Your Outlook*, Developer Network Journal, No. 25, p. 50-1, Jul.-Aug. 2001.

Taylor, T.C., *Databases Save Time And Customers*, Sales & Marketing Management, vol. 142, No. 4, p. 105-7, Mar. 1990.

Kubota, K.; Masuno, H., *Multi-Media Software PI*, NEC Technical Journal, vol. 41, No. 13, p. 72-6, Nov. 1988.

Pettigrew, T., *ACT!—Automated Contact Tracking*, CA Magazine, vol. 95, No. 1022, p. 48-9, Sep. 1991.

Simaioforidis, A.; Karlgren, J.; Ereback, A., *Research and Advanced Technology for Digital Libraries, Second European Conference, ECDL '98. Proceedings*, p. 673-4, Sep. 21-23, 1998.

Heller, S.R., *Symantec ACT! 4.0 for Windows*, Journal of Chemical Information and Computer Sciences, vol. 38, No. 4, p. 772, Jul.-Aug. 1998.

\* cited by examiner

CONTACT SCHEMA

BACKGROUND OF THE INVENTION

1. The Field of the Invention

The present invention relates to contact management systems and, more particularly, to schemas for managing contact information.

2. Background and Relevant Art

A contact management system is generally referred to in this application as a system, directory or database that contains contact information about people, groups, organizations, or any other identifiable entity, each of which is referred to herein as a contact. The term "contact information," as used herein, generally refers to any information that corresponds to a contact and that may be considered relevant for contacting, accessing, corresponding or communicating with the contact.

In the context of the present application, contact information is used by an application to perform a desired function, such as, for example, sending an email, initiating a telephone call, accessing a website, initiating a gaming session, performing a financial transaction, and so forth. Non-limiting examples of contact information include names, e-addresses, physical addresses, and personal information. Examples of names include professional names, personal names, titles, and phonetic names. Examples of e-addresses include email addresses, instant messaging addresses, network addresses, and telephone numbers. Examples of location or physical addresses include home addresses, work addresses, and postal addresses. Examples of personal information include gender designations, birth dates and names.

Contact management systems are extensively used in the computer industry to store and display contact information that is pertinent to the corresponding software applications to which they belong. For example, email applications typically include directories for storing and displaying the email addresses of contacts that can be emailed. Money management applications typically include directories for storing contact information about related financial contacts, such as, for example, banks, accounting service organizations, financial planning organizations, and so forth. Other examples of software applications that utilize contact management systems include time management applications, instant messaging applications, network gaming applications, business directory applications, telephony applications, and so forth.

Contact management systems are also widely used in many hardware devices that are not considered traditional computers. For example, many telephones, facsimile devices, and photocopying devices also include contact management systems for storing contact information that may be used to perform a desired function such as initiating a telephone call, a facsimile transmission, or a telecopy transmission.

One problem encountered by existing contact management systems, however, is that the large variety of specialized and disparate contact management systems and contact directories can make it difficult for a user to quickly access all available contact information for the various applications at the same time. This can be a problem, for example, when a user desires to identify all available means for making contact with a given entity because it may require the user to separately access various directories from many different contact management systems in order to obtain the desired contact information. For example, it may be necessary to access a telephone directory to obtain the home or cell telephone number for the contact, an email directory to obtain a primary email address for the contact, a business directory to obtain the business telephone number, and business email address of the entity, and so forth.

Having disparate contact management systems can also be a problem for obtaining different types of contact information about different contacts. For example, it may be desirable to view the email address of a first contact, the business telephone number of a second contact, and the cell telephone number of a third contact. If the desired contact data for each of the different entities is located in a different contact management system of different applications, then each application will have to be accessed to obtain the desired information, thereby requiring the undesirable expenditure of time and resources. This can particularly be a problem when the contact information is stored by different systems requiring different permission requirements before access will be granted because the user then has to remember the various permission requirements, in addition to going through the motion of logging into the various systems.

Searches and queries for specific contacts or contact information must also be performed separately on each of the various contact management systems. This can particularly be a problem when a user has forgotten in which of the contact management system directories the contact information is stored.

To overcome some of these problems, some contact management systems are configured to store more contact information than is required for the corresponding application. For example, an email directory may be configured to store the addresses, phone numbers and other information about the various contacts stored therein. However, it is somewhat undesirable to duplicatively enter every piece of contact information about every contact into every utilized contact management system. This redundant storage would also represent undesirable and unnecessary expenditure of resources.

Yet another problem with existing contact management systems is that because they are so specialized (e.g., designed to obtain specific contact information related to a specific application) they are not designed to identify relationships that exist between people, groups and organizations. This also inherently limits the scope and scalability of existing contact management systems to provide extensive and rich querying of the contact information.

BRIEF SUMMARY OF THE INVENTION

The present invention is directed to methods, systems, computer program products and corresponding schema and data structures for managing contact information.

According to one aspect of the invention, a schema is provided that defines people, groups and organizations by their corresponding contact information. The schema defines a person by personal data, name data, location data, and e-address data. A group is defined by group membership data and e-address data. Groups can also be defined by capabilities, as described below. Both groups and persons can also be defined by the publisher of the information associated with the groups and persons. An organization is defined by location data and by e-address data.

The schema also defines role occupancies for interrelating the various contacts. The role occupancies are defined by role occupancy data that may include employee data, team member data, group membership data, family data, customer or business data, and other types of data that can link two or more contacts. By interrelating contacts based on role occupancies, the schema is able to provide rich querying of one or more databases for obtaining desired contact information.

The schema of the invention may be used with one or more API's and user interfaces for accessing, displaying, and processing the desired contact information.

The schema also treats each person, group, and organization as a database item that can be copied, deleted, moved, opened, and printed, in a similar manner to a file. Accordingly, each contact can be categorized, placed in a folder, annotated, linked to, made into an attachment, be assigned properties, and so forth.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The present invention is directed to methods, systems, computer program products and corresponding schema and data structures for managing contact information stored on one or more storage media. The embodiments of the present invention may comprise or be performed with a special purpose or general-purpose computer including various computer hardware, as discussed in greater detail below.

Embodiments within the scope of the present invention include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Operating Environment

Figure 1:
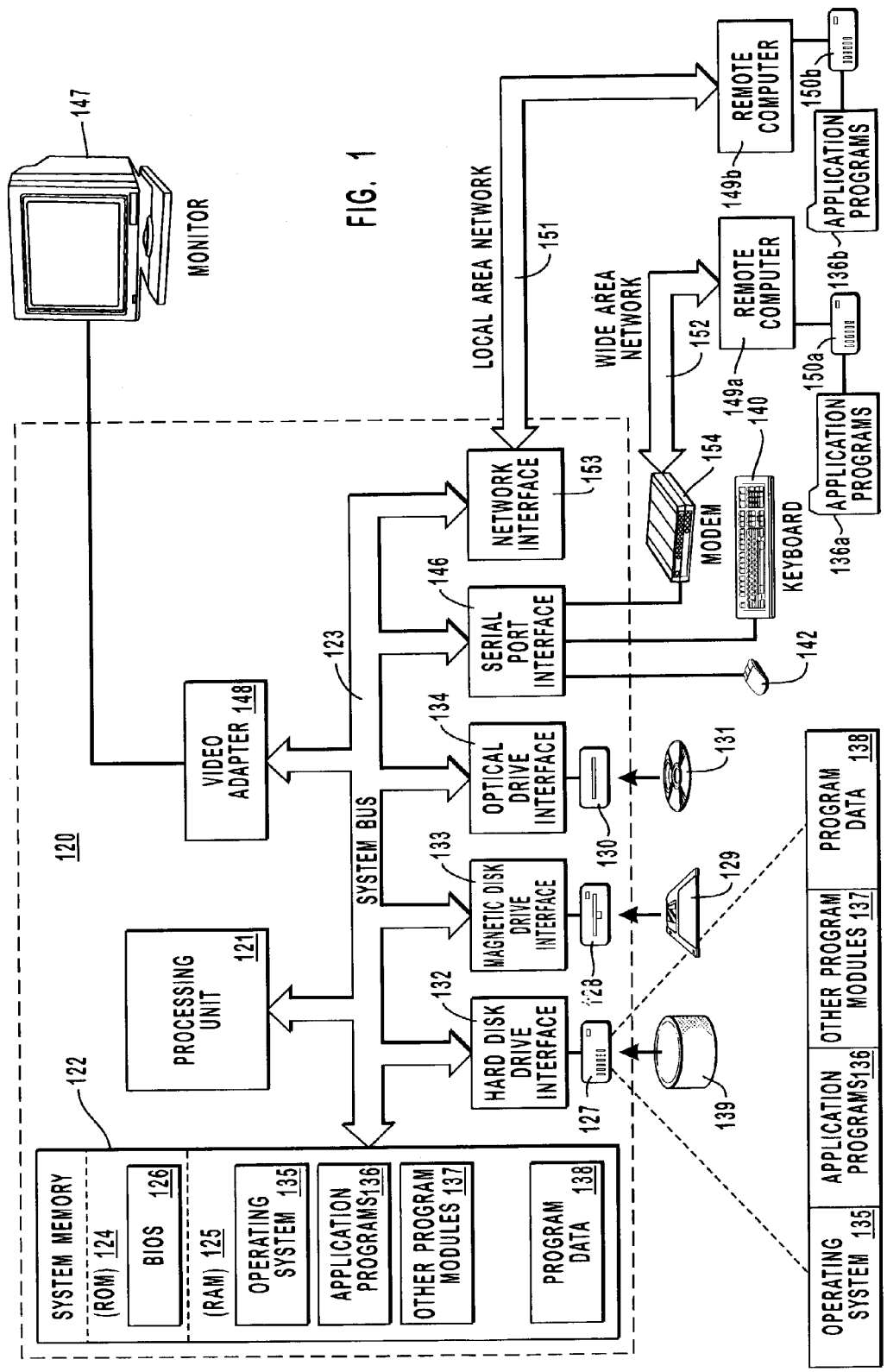
FIG. 1 illustrates one embodiment of an operating system that provides a suitable operating environment for the present invention.

FIG. 1 and the following discussion are intended to provide a brief, general description of a suitable computing environment in which the invention may be implemented. However, it should be emphasized that the present invention is not necessarily limited to any particular computerized system and may be practiced in a wide range of computerized systems including, but not limited to telephone and other communication devices, PDAs, information kiosks, and so forth.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing system in the form of a conventional computer 120, including a processing unit 121, a system memory 122 comprising computer readable media, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 20 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

Contact Schema

Figure 2:
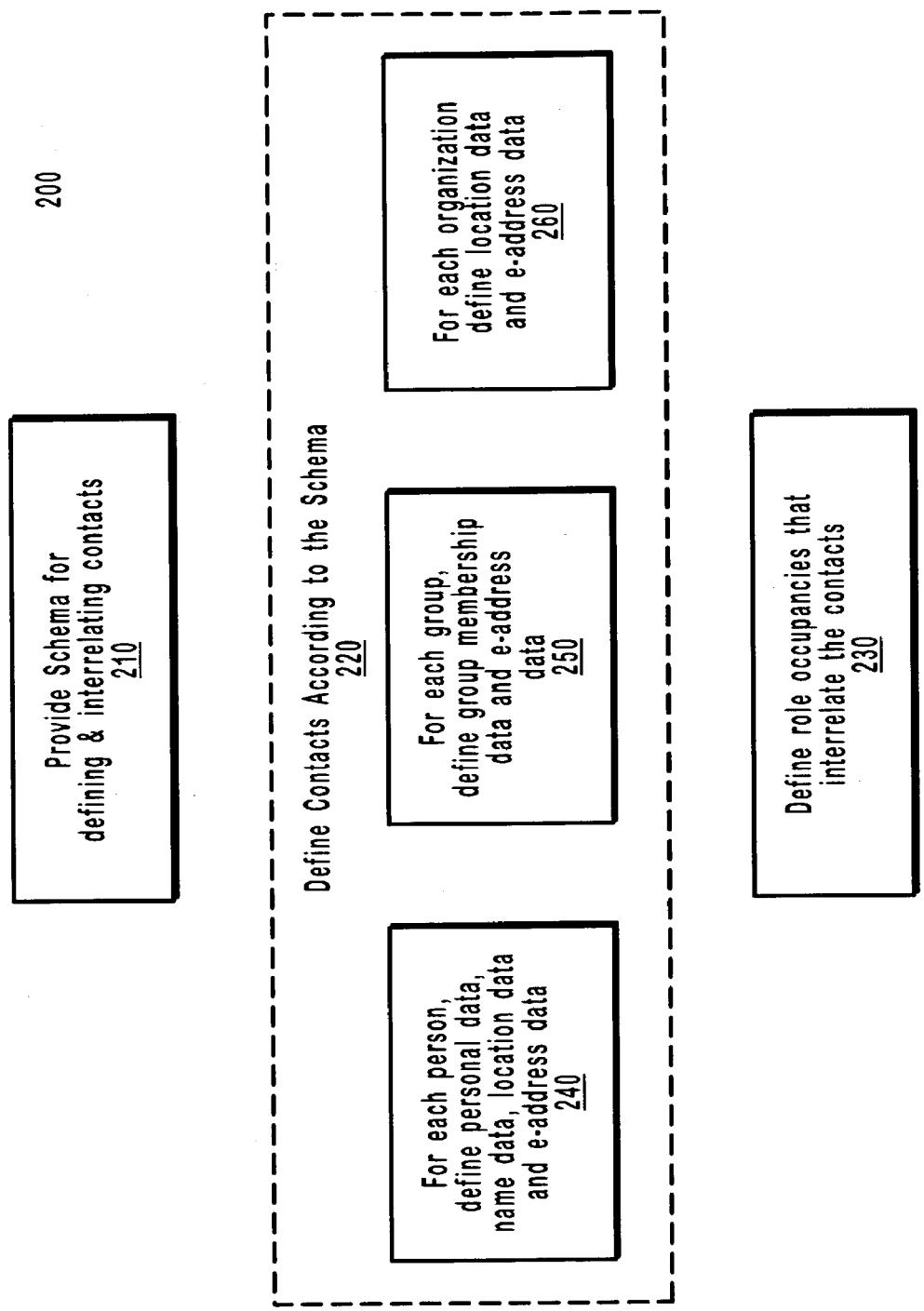
FIG. 2 is a flowchart illustrating certain acts of a method for defining and relating contacts according to one embodiment of the invention.

FIG. 2 illustrates a flowchart 200 of one method for defining and relating a plurality of contacts with contact information stored on one or more storage media based upon a predetermined schema. As shown, the present embodiment includes an act of providing a schema for defining and interrelating contacts (act 210), a step for defining contacts according to the schema (step 220), and an act of defining role occupancies that interrelate the contacts (act 230).

In the present embodiment, step 220 includes corresponding acts for defining the contacts. In particular, step 220 is shown to include an act of defining each person (act 240), defining each group (act 250), and defining each organization (act 260) with corresponding data. It will be appreciated, however, that step 220, is not limited to the acts illustrated in the present embodiment. Rather, step 220 may include any corresponding acts that are suitable for defining contacts according to the schema of the invention. Step 220 and each of the illustrated acts 210, 230, 240, 250, and 260 will now be described with specific reference to FIGS. 3A-5.

Figure 3A:
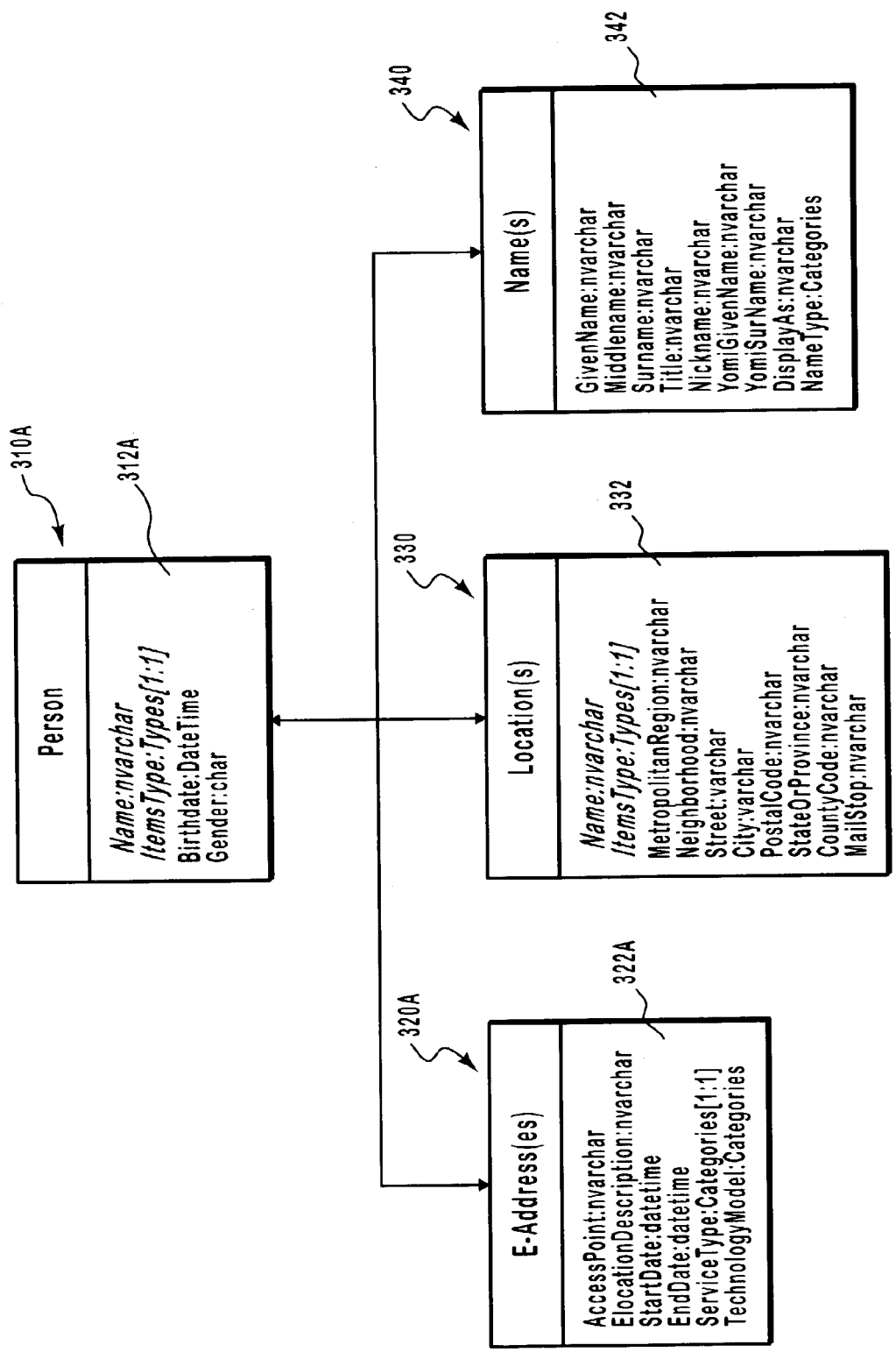
FIG. 3a illustrates a block diagram of a data structure for defining a person according to the schema of the invention.

FIG. 3A illustrates a block diagram of one embodiment of a contact 310A that is defined by the schema of the invention. As shown, the contact 310A comprises a person that is defined by personal data 312A and various other data contained within a plurality of data elements, including an e-address data element 320A, a location data element 330, and a name data element 340. According to this schema structure, a person is defined by personal data 312A, e-address data 322A, location data 332, and name data 342.

The personal data 312A may include a display name by which the contact is identified on a user interface, a contact designation (to identify whether the contact is a person, a group or an organization), a person's birth date, and a person's gender. Although not shown in the present embodiment, the personal data 312A may also include identity keys that are used to identify the person to a system. For example, a PIN may be an identity key. It will also be appreciated that a person may have more than one identity key, any combination of which may be included in the person's personal data 312A.

The e-address data 322A may include data identifying an email address, an instant messaging address, a network address, a telephone number, or any other electronic address and corresponding data. The term "e-address" is used interchangeably herein with the term "e-location" and "elocation".

According to one embodiment, the e-address data 322A includes an access point that comprises the actual telephone number, email address, or other electronic address assigned to the person. The e-address data 322A may also include a service type category for designating what service the e-address corresponds with (e.g., instant messaging, email, telephone, etc.). The e-address data 322A may also include an e-location descriptor that characterizes or differentiates between a multiplicity of similar service types. For example, the e-location description may characterize 'telephone' service types as 'home' and 'cell', 'second line,' and so forth. Start and end dates may also be provided to designate a term for which the e-address is valid. The e-address data 322A may also include a technology model category field for defining the type of network or system hosting the e-address (e.g., MSN, SMTT, etc.)

The location data 332 may include physical address information corresponding with the residence or domicile of the contact 310A. For example, the location data 332 may include a descriptive name of the address, the type of address (e.g., postal address, real address), and the region, neighborhood, street, city, postal code, state, country, and mail stop associated with the contact's address.

The name data 342 may include various names of the contact. Examples of names that may be used include a given name (first name), a middle name, a surname, a title, a nickname, a yomi names (phonetical names), and display names. The name data 342 may also include a name type category designation to designate the types of names that are included in the name data 342 (e.g., a professional names, a personal names, and so forth).

Figure 3B:
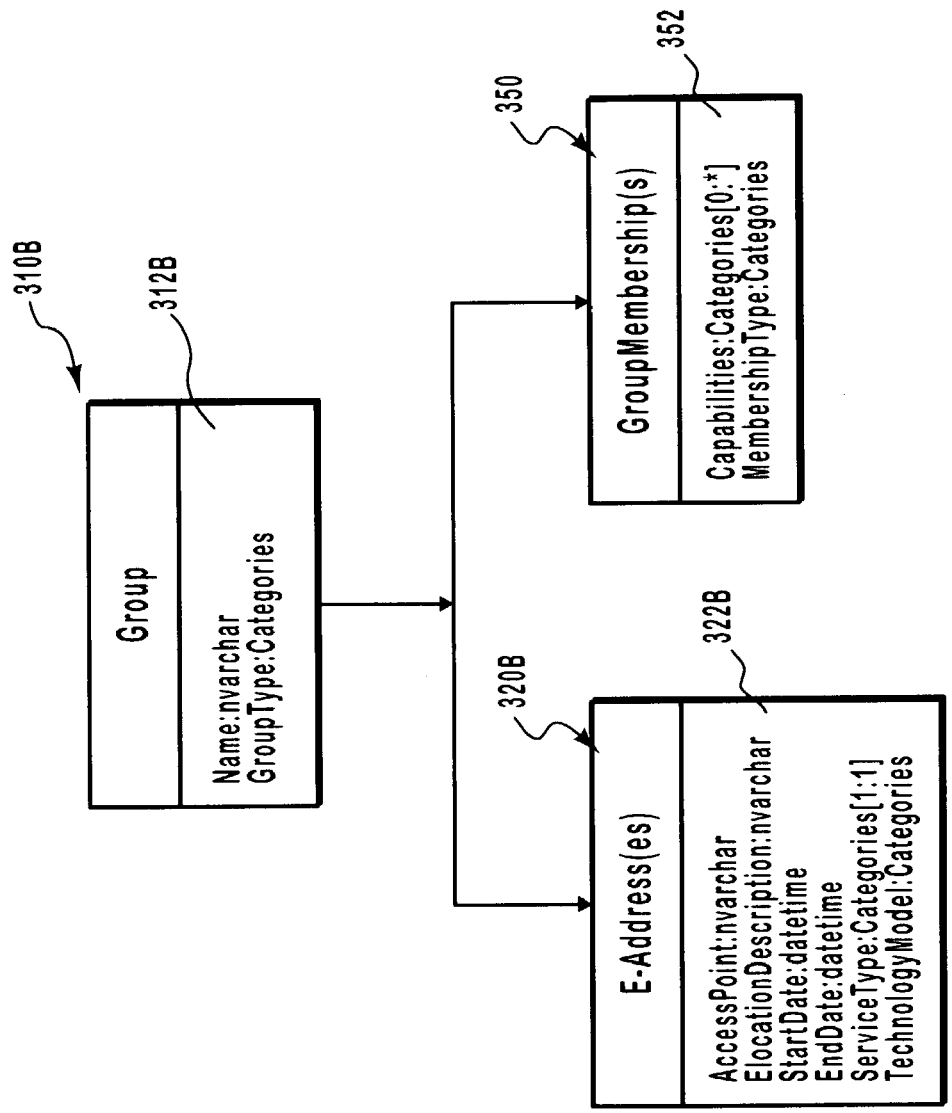
FIG. 3b illustrates a block diagram of a data structure for defining a group according to the schema of the invention.

Attention is now directed to FIG. 3B, which illustrates a block diagram of another contact 310B that is defined by the schema of the invention. In this embodiment, the contact 310B includes a group contact. According to one embodiment, a group is a collection of people or other contacts who are related together by an identifiable membership. By way of example, and not limitation, a soccer club and a chess club comprise collections of people that are related by membership to a group.

As shown in FIG. 3B, the schema defines groups according to group identification data 312B and various other data that is contained within a plurality of data elements, including an e-address data element 320B and a group membership data element 350. Similar to the e-address data element 320A, described above, the e-address data element 322B may include e-address data 322B that defines an email address, an instant messaging address, a network address, a telephone number, or any other electronic address for electronically contacting the members of the group.

By way of example, the e-address data 322B may include an access point that comprises the email address or other electronic address used to contact the group. The e-address data 322B may also include an e-location descriptor that characterizes the type of address that is specified, as described above. Start and end dates may also be provided to designate a term for which the e-address is valid. The e-address data 322B may also include a service type category for designating what service the e-address corresponds with (e.g., email, instant messaging, etc.) and a technology model category field for defining the type of network or system hosting the e-address (e.g., MSN, SMTT, etc.)

The group is also defined by a group membership data 352, which may include capability data for designating a person's capacity in the group (e.g., a person may be identified as a president within a group, as shown below in reference to FIG. 5.) The group membership data 352 may also include a membership type for designating the type of membership a person has (e.g., annual, monthly, life, etc.). Generally, the group membership data 352 is used as role occupancy data to define relationships existing between principal contacts, such as a person and a group, as described below in more detail with reference to FIGS. 4 and 5.

In other embodiments, the group is further defined by group data comprising additional definitions defining the group, such as the size and characteristics of the group. A group may also be defined by resources or locations utilized by and associated with the group. By way of an example, a conference room used by a group or an administrator who works with a group comprise resources that may be associated with the group, but would not be included in a group "task," such as emailing or IM-ing the members of the group.

Figure 3C:
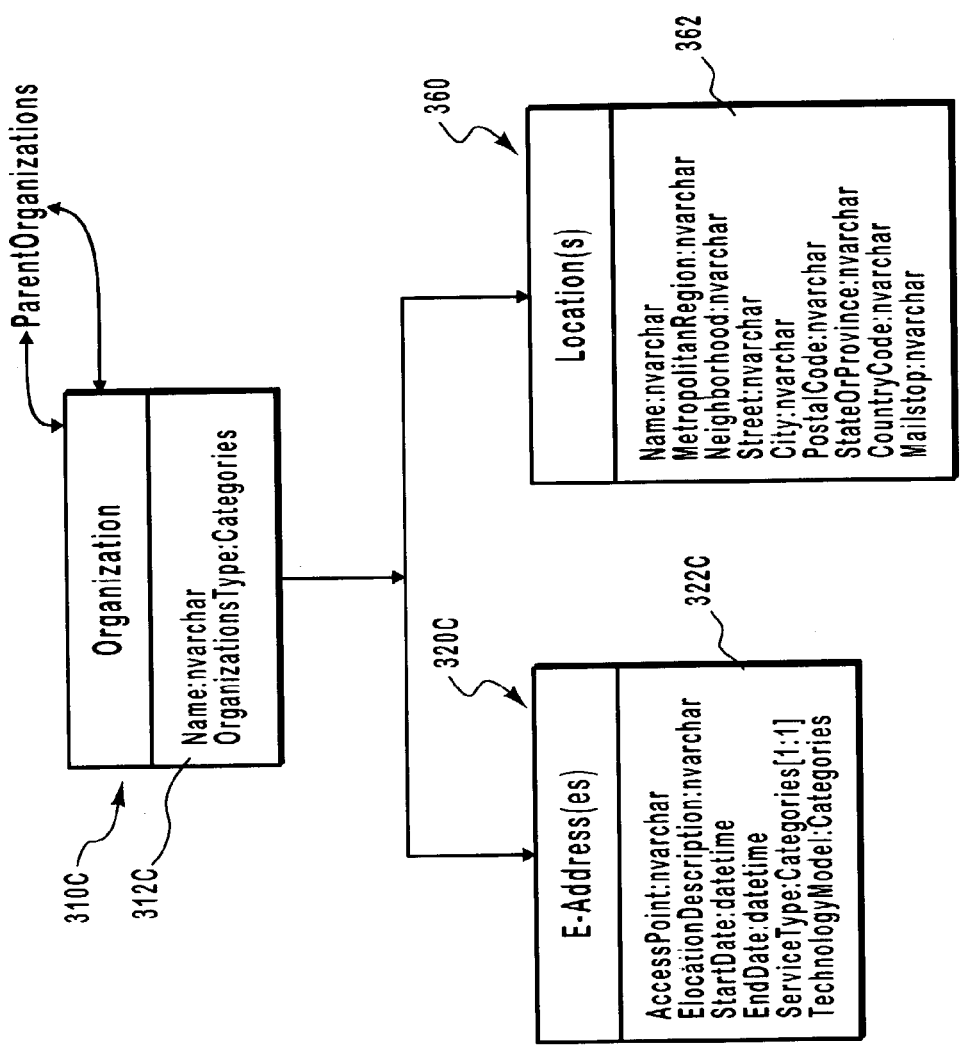
FIG. 3c illustrates a block diagram of a data structure for defining an organization according to the schema of the invention.

FIG. 3C illustrates a block diagram of yet another principal contact comprising an organization 310C that is defined by the schema of the invention. As shown, the organization 310C is defined by organization identification data 312C, as well as other data that is contained within an e-address data element 320C and a location data element 360. The e-address data 322C contained within e-address data element 320C is similar to the e-address data 322A, described above, only corresponding to the organization instead of a person. For example, the e-address data 322C may include an email address or telephone number of a corporation.

The location data element 360 contains location data 362 corresponding to the physical location of the organization. For example, the location data 332 may include a descriptive name of the address, the type of address (e.g., postal address, real address), and the region, neighborhood, street, city, postal code, state, country, and mail stop associated with the organization headquarters (e.g., financial headquarters, legal headquarters, and/or geographic headquarters).

As shown in FIG. 3C, the organization contact 310C may also be linked to parent organizations. It will be appreciated that an organization may be associated and linked with any number of parent organizations and in any type of hierarchal tree structure. An exemplary hierarchy of parent organizations is not shown.

According to one embodiment, the organization contact 310C, the group contact 310B, and the person contact 310A each comprise principal contacts. These principal contacts are related by role occupancies according to the schema of the present invention. It will be appreciated, however, that not all principals comprise contacts. For example, some principals may include computers or other objects. Accordingly, a principal can more broadly be construed as an entity or object that can be assigned access permissions. The term "role occupancy" is generally defined herein as a relationship existing between two or more principals. Accordingly, role occupancies may include corresponding role occupancy data defining the relationships between the two or more principals.

Figure 4:
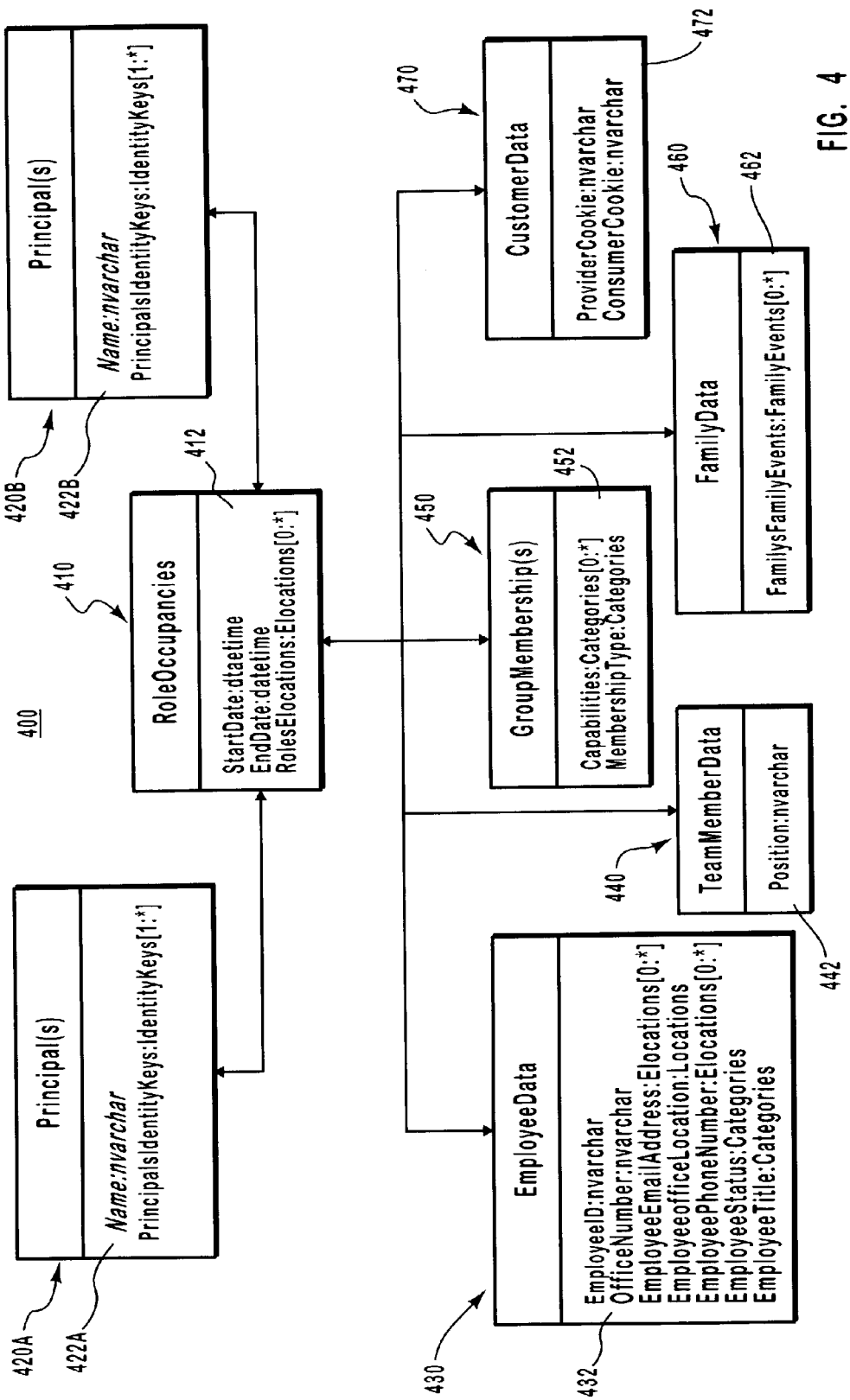
FIG. 4 illustrates a block diagram of a data structure for defining role occupancies that can be used to interrelate contacts according to the schema of the invention.

FIG. 4 illustrates a block diagram 400 showing how two principals 420A, 420B are related according to the schema with role occupancies 410. In the example. illustrated in FIG. 4, two principals 420A and 420B are defined by corresponding data 422A, 422B. This corresponding data 422A, 422B may include, but is not limited to, any of the data described above with specific reference to personal data 312A, e-address data 322A, 322B, 322C, location data 332, 362, name data 342, group membership data 352, group identification data 312B, and organization identification data 312C.

However, in the present embodiment, data 422A and 422B are only shown to include name data and principal identification key data. The name data corresponds to the name of the principal contact (e.g., the name of the person, group, or organization), as described above. The principal identification key data corresponds with one or more characters or symbols that are used to identify the principal to another principal. By way of example, and not limitation, a person's numeric PIN may be used with a person's name to identify the person to an organization, such as a financial organization. A person may have many principal identification keys corresponding to many different organizations, groups and people. Organizations and groups may also have principal identification keys.

The principals 420A and 420*b* are related, according to the invention, by role occupancy data contained within one or more data elements, including an employee data element 430, a team member data element 440, a group membership data element 450, a family data element 460, and a customer data element 470. The role occupancy data described herein is used to define the role occupancies that interrelate the contacts, act 230 (FIG. 2).

Role occupancy data may also include additional data 412 that defines the parameters of the role occupancy. For example, additional data 412 can be used to define a valid term of a role occupancy 410 based on start and end dates. Additional data 412 can also be used to identify any e-locations relating the principals 420A and 420B, such as, for example, a common email used by the principals 420A and 420B.

If the principals 420A and 420B are related by an employment relationship, the role occupancy data defining the employment relationship can include employee data 432, such as an employee's ID, an office number where the employee works, the employee's email, work location (work address), work phone number, the employee's status (temporary, full-time, part-time, etc.), and the employee's title with the employer.

If the relationship between the principals 420A and 420B comprises a team relationship, then role occupancy data defining the relationship can include team member data 442, such as a position the team member occupies in the team.

If the relationship between the principals 420A and 420B comprises a group relationship, then the role occupancy data defining the relationship can include group membership data 452, such as group capability and membership type, as described above in reference to FIG. 3B.

If the relationship between the principals 420A and 420B comprises a family relationship, then the role occupancy data can include family data 462, including family event data. Family event data may include family event data for defining any shared family event (e.g., family reunion, family trip, and so forth).

If the relationship between the principals comprises a business relationship, such as a business-consumer relationship, then the role occupancy data may comprise consumer data 472. The customer data 472 may include any data considered relevant for relating a consumer to a business. In one embodiment, the consumer data 472 includes provider and customer cookie fields for defining the attributes and characteristics of the provider and customer, respectively.

Figure 5:
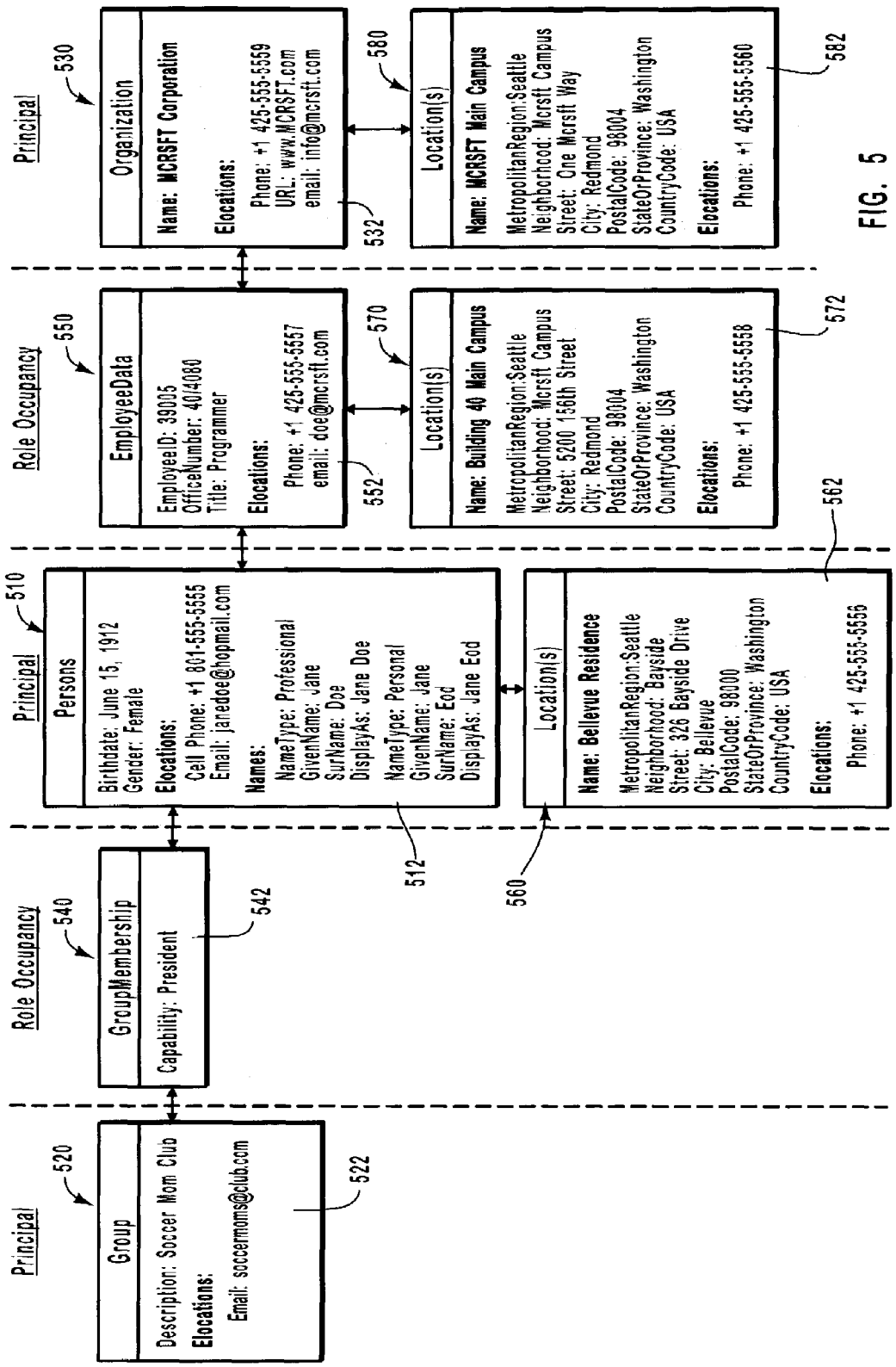
FIG. 5 illustrates a block diagram of a data structure that defines a person, a group and an organization that are interrelated by role occupancy data.

Attention is now directed to FIG. 5, which illustrates one example of three principals (a person 510, a group 520, and an organization 530) that are related through role occupancies (group membership 540 and employee data 550). It will be appreciated that this example is provided as a mater of illustration and not limitation, to further illustrate how the schema of the invention can be used to define and relate contacts.

As shown, person 510 is defined by various data 512, including personal data e-location data, name data, and location data. More particularly, person 510 is defined as a female having a birth date of Jun. 15, 1912. The person 510 is further defined by a plurality of e-locations and names. The e-locations include a cell phone number and an email address. Person 510 is also defined by yet another phone number that is listed in the location data 562 and that corresponds with the person's 510 residential telephone line. The names defining person 510 include a professional name of Jane Doe and a personal name of Jane Eod. Person 510 is also defined by location data 562 that is contained within location data element 560 and that includes the name, region, neighborhood, and residential address of person 510.

According to the present example, the second principal 520 includes a group defined as a soccer mom club, having an e-location comprising an email address. The third principal 530 is defined as MCRSFT Corporation, having phone, URL, and email e-locations. The third principal 530 is also defined by location data 582 contained within a location data element 580. The location data 582 includes region, neighborhood, street, city, postal, state, and country address data, as well as a name and e-location associated with the address data.

Each of the three principals 510, 520 and 530 are related according to the present embodiment by role occupancies 540 and 550, as mentioned above. More particularly, role occupancy 540 relates principal 510 to principal 520 with role occupancy data 542. Role occupancy 540 comprises a group membership and the role occupancy data 542 includes the capability of 'president.' Accordingly, principal 510 (Jane Doe) is a member and president of group 520 (Soccer Mom Club).

Likewise, role occupancy 550 relates principal 510 to principal 530 with role occupancy data 552. As shown, role occupancy 550 comprises an employment relationship that is defined by role occupancy data 552. In the present embodiment, the role occupancy data 552 includes data fields defining the employee's ID, office number, title, and corresponding work email address and telephone number. Accordingly, the role occupancy data 552 defines principal 510 (Jane Doe) as an employee of principal 530 (MCRSFT Corp.). Role occupancy 550 is further defined by location data 572 contained within location data element 570. The location data 572 includes the address of the building in which the employee (Jane Doe) works, along with a name of the building and the telephone number of the building.

By interrelating contacts based on role occupancies, as shown and described above, the schema is able to provide rich querying of one or more databases for obtaining desired contact information of people, groups and organizations. The schema may used with one or more API's and user interfaces for entering, accessing, displaying, and processing the desired contact information in the desired format.

In one embodiment, the disclosed schema is provided to one or more API's and user interfaces (act 210) belonging to one or more computing systems for enabling contacts to be defined and related according to the schema of the invention. The contacts are defined, based on the schema (step 220), according to the structure defined above with reference to FIGS. 3A-3C. This may be accomplished automatically, such as when contact information is extracted from preexisting databases. Alternatively, the contacts can be defined manually by entering the appropriate contact information via an appropriate user interface. Role occupancies may also be defined automatically or manually, either extracting data from preexisting databases or through manual data entry (act 230). Once the appropriate contact information is obtained, it can be stored in data fields corresponding with the structure of the schema, as described above. The schema may be considered predetermined, based upon a predetermined set of definitions. The schema can also be considered dynamic because it can be updated and changed continuously as new role occupancies are created to interrelate the contacts defined by the schema, thereby providing extensibility.

According to one embodiment, the schema treats each principal contact (person, group, and organization) as a database item that can be copied, deleted, moved, opened, and printed, in a similar manner to a file. This enables each principal contact to be categorized, placed in a folder, annotated, linked to, made into an attachment, be assigned properties, and so forth. It will be appreciated that this can be particularly useful for enabling the exchange of contact information from disparate databases.

As shown in FIG. 5, each of the location data elements 560, 580 and 570 are separated from the corresponding principals and role occupancies 512, 532, and 552, respectively. This separation of the location data elements 560, 570 and 580 enables the location data elements 560, 570, and 580 to also be treated as independent items, enabling the location data elements 560, 570 and 580 to be categorized, placed in a folder, annotated, linked to, made into attachments, be assigned properties, and so forth. This may be useful, for example, to link a map or a weather forecast to a location data element.

It will be appreciated that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for defining and relating a plurality of contacts having corresponding contact information stored on one or more storage media and based upon a predetermined schema, the method comprising:

an act of providing a predetermined schema for defining and interrelating a plurality of corresponding contacts, which include at least one person, at least one group and at least one organization, and based on the corresponding contact information stored in the one or more storage media;

an act of providing with the predetermined schema, data fields for defining a person with personal contact information within three person data elements, the three person data elements comprising:

an person e-address data element having an access point data field, an elocation descriptor data field, a start date data field and end date data field, a service type data field and a technology model category field;

a location data element having a region data field, a neighborhood data field, a street data field, a city data field, a postal code data field, a state or province data field, a country code data field and a mailstop data field, and a name data element having a given name data field, a middle name data field, a surname data field, a title data field, a nickname data field, at least one phonetic yomi name data field; a display name data field and a name type category data field;

wherein the three person data elements are hierarchically organized as children to a person class defined by a person name, a person type, a birthdate and a gender;

an act of providing with the predetermined schema, data fields for defining a group with group contact information within two group data elements, the two group data elements comprising:

a group e-address data element having an access point data field, an elocation descriptor data field, a start date data field and end date data field, a service type data field and a technology model category field, wherein the start date data field and the end date data field define a start and end date for which an e-address defined by the e-address data element is valid; and a group membership data element having a capabilities data field for designating a person's capability within the group and a membership type data field for defining a type of membership the person has within the group;

wherein the two group data elements are hierarchically organized as children to a group class defined by a group name and a group organization type;

an act of providing with the predetermined schema, data fields for defining an organization with organization contact information within two organization data elements, the two organization data elements comprising:

an organization e-address data element having an access point data field, an elocation descriptor data field, a start date data field and end date data field, a service type data field and a technology model category field; and a location data element having a region data field, a neighborhood data field, a street data field, a city data field, a postal code data field, a state or province data field, a country code data field and a mailstop data field, wherein the two organization data elements are hierarchically organized as children to an organization class defined by an organization name and an organization type, an act of providing with the predetermined schema, role occupancies having corresponding role occupancy data fields for defining the role occupancies of the contacts, the role occupancies comprising relationships between contacts, and wherein at least one role occupancy and corresponding role occupancy data fields interrelate at least one person with at least one contact other than a person;

automatically defining at least one role occupancy for at least one contact that interrelates the at least one contact with at least one other contact and based on contact information extracted from at least one preexisting database; and an act of accessing the predetermined schema with one or more interfaces to identify and display any of the person, group or organization contact information defined in accordance with the predetermined schema.

2. A method as recited in claim 1, wherein the method further includes, for each person having contact information stored in the one or more storage media, an act using the predetermined schema to define corresponding personal data, name data, location data, and e-address data.

3. A method as recited in claim 2, wherein the personal data includes birth date, gender designation, and an identity key.

4. A method as recited in claim 1, wherein the method further includes an act, for each group having contact information stored in the one or more storage media, of defining corresponding group membership data and e-address data.

5. A method as recited in claim 1, wherein the method further includes an act, for each organization having contact information stored in the one or more storage media, of defining corresponding location data and e-address data.

6. A method as recited in claim 1, wherein the relationship between the at least one person and at least one contact other than a person includes an employment relationship, and wherein the role occupancy data includes employee data corresponding with the at least one person.

7. A method as recited in claim 1, wherein the relationship between the at least one person and at least one contact other than a person includes a group relationship, and wherein the role occupancy data includes group membership data corresponding with the at least one person.

8. A method as recited in claim 1, wherein the relationship between the at least one person and at least one contact other than a person includes a team relationship, and wherein the role occupancy data includes team position data corresponding with the at least one person.

9. A method as recited in claim 1, wherein the relationship between the at least one person and at least one contact other than a person includes a family relationship, and wherein the role occupancy data includes family event data corresponding with the at least one person.

10. A method as recited in claim 1, wherein the relationship between the at least one person and at least one contact other than a person includes a business relationship, and wherein the role occupancy data includes at least one of consumer and provider data corresponding with the at least one person and the at least one contact other than a person.

11. A computer program product comprising one or more computer-readable storage media storing computer-executable instructions for implementing the method recited in claim 1.

12. A computer program product as recited in claim 11, wherein the one or more computer-readable media include system memory.

13. A method as recited in claim 1, wherein each contact defined by the predetermined schema is defined as a principal that is treated by the schema as a database item that can be copied, deleted, moved, opened and printed in a similar manner as a file and thereby enabling each contact to be categorized, placed in a folder, annotated, linked to, assigned properties and .made into an attachment.

14. A method as recited in claim 1, wherein the predetermined schema further includes additional data fields for defining the group comprising a data field for defining a size of the group and a data field for defining resources utilized by or available to the group.

15. A method as recited in claim 1, wherein the a role occupancy data fields are contained within five role occupancy data elements, including an employee data element, a team member data element, a group member data element, a family data element and a customer data element.

16. A method as recited in claim 1, wherein the method includes using the schema to provide user access through the one or more interfaces to contact information stored in a plurality of different databases.

17. A method as recited in claim 1, wherein the method includes using the schema to provide user access to the membership type data field that defines a type of membership a person has within a group membership data element and to thereby identify the membership the person has within the group to the user and wherein the method includes using the schema to provide user access to the neighborhood data field that defines a neighborhood a contact corresponds to and to thereby identify the corresponding neighborhood of the contact to the user.

18. The method recited in claim 1, wherein the method further includes assigning a valid term to the at least one role occupancy based on a start date and an end date for the at least one role occupancy.

* * * * *